(12) United States Patent
Rivest

(10) Patent No.: US 9,800,040 B2
(45) Date of Patent: Oct. 24, 2017

(54) FITTING FOR USE WITH ARMORED CABLE

(71) Applicant: Omega Flex, Inc., Middletown, CT (US)

(72) Inventor: Dean W. Rivest, Oxford, PA (US)

(73) Assignee: OMEGA FLEX, INC., Middletown, CT (US)

( * ) Notice: Subject to any disclaimer, the term of this patent is extended or adjusted under 35 U.S.C. 154(b) by 0 days.

(21) Appl. No.: 15/319,419

(22) PCT Filed: Jun. 1, 2015

(86) PCT No.: PCT/US2015/033455
§ 371 (c)(1),
(2) Date: Dec. 16, 2016

(87) PCT Pub. No.: WO2015/195302
PCT Pub. Date: Dec. 23, 2015

(65) Prior Publication Data
US 2017/0149232 A1 May 25, 2017

Related U.S. Application Data

(60) Provisional application No. 62/012,505, filed on Jun. 16, 2014.

(51) Int. Cl.
*H02G 15/013* (2006.01)
*H02G 3/04* (2006.01)
*H02G 3/06* (2006.01)

(52) U.S. Cl.
CPC ......... *H02G 15/013* (2013.01); *H02G 3/0468* (2013.01); *H02G 3/0683* (2013.01)

(58) Field of Classification Search
CPC ... H02G 15/013; H02G 3/0468; H02G 3/0683
USPC ........................................................ 174/653
See application file for complete search history.

(56) References Cited

U.S. PATENT DOCUMENTS

| 3,757,279 A | 9/1973 | Winston |
| 3,846,738 A | 11/1974 | Nepovim |
| 4,674,775 A * | 6/1987 | Tajima ................ F16L 19/0206 285/330 |
| 5,763,833 A | 6/1998 | Bawa et al. |
| 5,938,474 A * | 8/1999 | Nelson ................ H01R 9/0521 439/578 |
| 6,034,325 A | 3/2000 | Nattel et al. |

(Continued)

OTHER PUBLICATIONS

International Search Report and Written Opinion for application PCT/2015/033455, dated Aug. 21, 2015, 11 pgs.

*Primary Examiner* — Timothy Thompson
*Assistant Examiner* — Michael F McAllister
(74) *Attorney, Agent, or Firm* — Cantor Colburn LLP

(57) ABSTRACT

A fitting for use with a cable contained in a corrugated metal tubing, the fitting including an adaptor having an internal, longitudinal passage to receive the cable; a body coupled to the adaptor; an internal seal positioned between the adaptor and the body, the internal seal radially disposed about the cable; a nut coupled to the body; and a sealing member positioned between the nut and the body, the sealing member for placement in a valley of the corrugated metal tubing to compress a portion of the corrugated metal tubing between the sealing member and the body.

14 Claims, 6 Drawing Sheets

(56) References Cited

U.S. PATENT DOCUMENTS

| | | |
|---|---|---|
| 6,354,851 B1 | 3/2002 | Bachle |
| 7,677,609 B2* | 3/2010 | Treichel ............... F16L 19/065 |
| | | 285/322 |
| 7,785,144 B1 | 8/2010 | Islam |
| 8,105,096 B2 | 1/2012 | Dixon et al. |
| 8,399,767 B2* | 3/2013 | Duquette ............... F16L 9/147 |
| | | 174/650 |
| 8,577,196 B1 | 11/2013 | McNutt |
| 2006/0134979 A1 | 6/2006 | Henningsen |
| 2009/0174154 A1* | 7/2009 | Chiu ........................ F16L 5/00 |
| | | 277/603 |
| 2010/0117358 A1* | 5/2010 | Treichel ............... F16L 19/065 |
| | | 285/322 |
| 2012/0088404 A1 | 4/2012 | Wild et al. |
| 2013/0087381 A1* | 4/2013 | Daughtry ............ H02G 3/0691 |
| | | 174/660 |
| 2014/0045356 A1 | 2/2014 | Natoli et al. |

* cited by examiner

FITTING FOR USE WITH ARMORED CABLE

CROSS-REFERENCE TO RELATED APPLICATIONS

This application claims the benefit of U.S. provisional patent application Ser. No. 62/012,505, filed Jun. 16, 2014, the entire contents of which are incorporated herein by reference.

BACKGROUND

This disclosure relates generally to armored cable and in particular to a fitting for use with armored cable. Currently, armor protected cabling is used in a number of applications requiring exterior protection in hazardous locations. Various local and federal codes and specifications require protection in this type of environment.

SUMMARY

An exemplary embodiment includes a fitting for use with a cable contained in a corrugated metal tubing, the fitting including an adaptor having an internal, longitudinal passage to receive the cable; a body coupled to the adaptor; an internal seal positioned between the adaptor and the body, the internal seal radially disposed about the cable; a nut coupled to the body; and a sealing member positioned between the nut and the body, the sealing member for placement in a valley of the corrugated metal tubing to compress a portion of the corrugated metal tubing between the sealing member and the body.

In addition to one or more of the features described above or below, or as an alternative, further embodiments could include a jacket seal positioned on an internal surface of the nut, the jacket seal to contact an outer jacket disposed on the corrugated metal tubing.

In addition to one or more of the features described above or below, or as an alternative, further embodiments could include wherein the adaptor is received in a cavity of the body.

In addition to one or more of the features described above or below, or as an alternative, further embodiments could include wherein a first end of the adaptor has external threads to engage internal threads in the cavity of the body.

In addition to one or more of the features described above or below, or as an alternative, further embodiments could include wherein the internal seal is compressed between the adaptor and the body.

In addition to one or more of the features described above or below, or as an alternative, further embodiments could include wherein the internal seal is an elastomeric seal.

In addition to one or more of the features described above or below, or as an alternative, further embodiments could include wherein the nut includes and internal, radial groove; the fitting comprising a jacket seal positioned in the groove, the jacket seal to contact an outer jacket disposed on the corrugated metal tubing.

In addition to one or more of the features described above or below, or as an alternative, further embodiments could include wherein an end of the body has external threads to engage internal threads in a cavity of the nut.

In addition to one or more of the features described above or below, or as an alternative, further embodiments could include wherein the body includes a body sealing surface and the sealing member includes a sealing surface to compress the portion of the corrugated metal tubing between the body sealing surface and the sealing surface.

In addition to one or more of the features described above or below, or as an alternative, further embodiments could include wherein the body sealing surface is radiused.

In addition to one or more of the features described above or below, or as an alternative, further embodiments could include wherein the body sealing surface includes a section of a sphere.

In addition to one or more of the features described above or below, or as an alternative, further embodiments could include wherein the sealing surface is planar.

In addition to one or more of the features described above or below, or as an alternative, further embodiments could include wherein the sealing surface is frustoconcial.

DETAILED DESCRIPTION OF EXEMPLARY EMBODIMENTS

Figure 1:
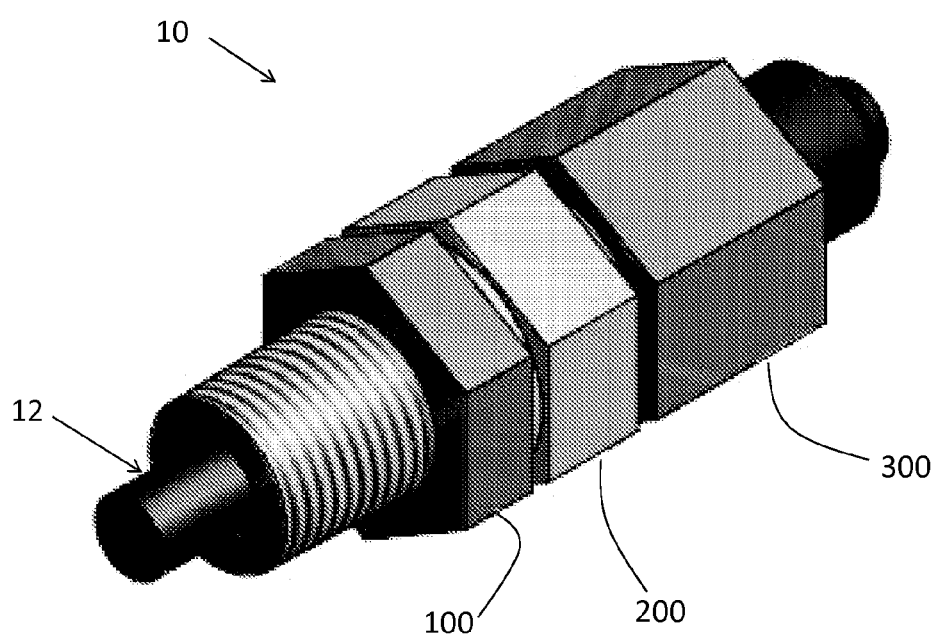
FIG. 1 is a perspective view of an armored cable fitting coupled to armored cable in an exemplary embodiment.

FIG. 1 is a perspective view of an armored cable fitting 10 coupled to armored cable 12 in an exemplary embodiment. Cable 12 may be an electrical cable, fiber optic cable, communication cable, etc. contained in a corrugated metal tubing having a jacket. Fitting 10 includes an adaptor 100, body 200 and nut 300. As described in further detail herein, fitting 10 includes three sealing mechanisms to maintain a fluid (e.g., liquid and/or gas) tight seal around the cable 12.

Figure 2:
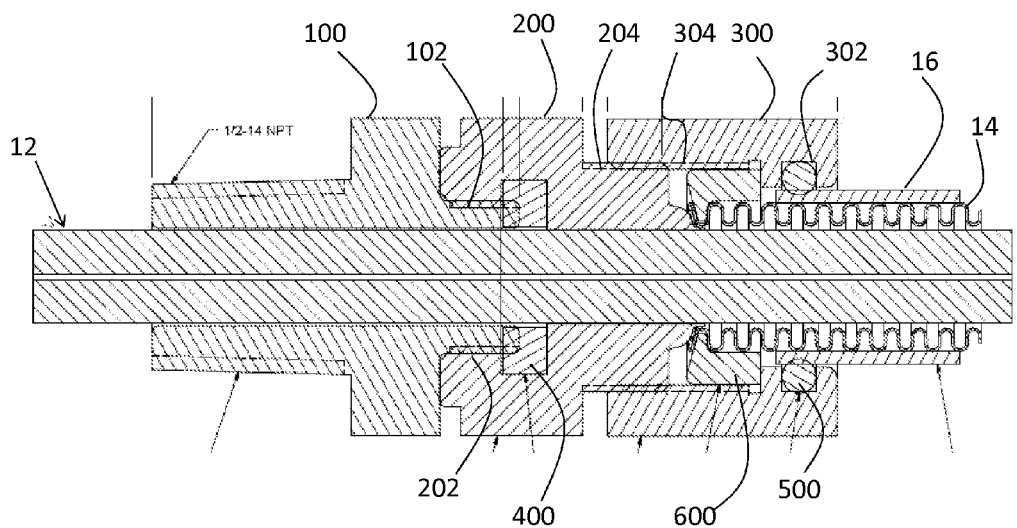
FIG. 2 is a cross-sectional view of the armored cable fitting of FIG. 1.

FIG. 2 is a cross-sectional view of the armored cable fitting 10 and cable 12 of FIG. 1. Cable 12 is contained in metal tubing 14, such as corrugated stainless steel tubing (e.g., annular or helical) having a series of peaks and valleys. The metal tubing 14 includes a jacket 16 on an outer surface thereof. Jacket 16 may be made from a polymer material to protect the metal tubing 14 from environmental factors, corrosives, etc.

Adaptor 100 receives cable 12 through an internal, longitudinal passageway. Adaptor 100 includes a first end 102 have external threads. The first end 102 is received inside an internally threaded cavity 202 of body 200. Also positioned in cavity 202, radially disposed about cable 12, is an internal seal 400. Internal seal 400 abuts against the distal end of first end 102. As adaptor 100 is threaded into body 200, internal seal 400 is compressed to seal against fluids (e.g., liquid, gas, etc.). Internal seal 400 may be an elastomeric seal that can be repeatedly compressed, and still provide a fluid-tight seal.

Nut 300 is positioned over jacket 16. Nut 300 includes an internal, radial groove 302 to receive a jacket seal 500 (e.g., an o-ring) that seals against jacket 16. Jacket seal 500 provides a fluid-tight seal against jacket 16.

A sealing member 600 is positioned internal to the nut 300. Sealing member 600 may be a pair of split rings, a collet, a C-ring, etc. The sealing member 600 is received in a valley of the metal tubing 14 to restrict motion of the metal tubing 14 relative to nut 300. Sealing member 600 includes a conical sealing surface 602 (FIG. 5) to compress metal tubing against the body sealing surface 206 (FIG. 4) as described herein.

Body 200 has an externally threaded end 204 which is received in an internally threaded cavity 304 of nut 300. As body 200 is threaded into nut 300, metal tubing 14 (e.g., a peak or two layers of metal) is compressed between a sealing surface of sealing member 600 and a body sealing surface of body 200. This forms a fluid-tight, metal-to-metal seal between the sealing member 600 and body 200.

To assemble fitting 10 to cable 12, a section of the metal tubing 14 and jacket 16 is removed. Metal tubing 14 may be cut in a valley. Cable 12 is routed through nut 300 and sealing member 600 placed in a valley of metal tubing 14. Nut 300 is tightened to body 200, to form the metal-to-metal seal. Adaptor 100 may then be threaded into body 200 to compress internal seal 400.

Figure 3:
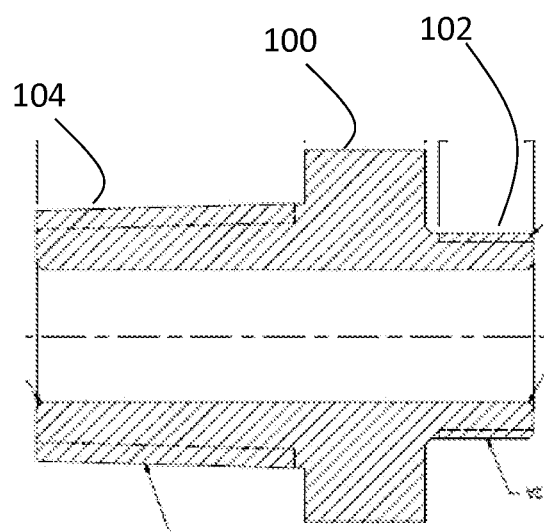
FIG. 3 is a cross-sectional view of an adaptor of FIG. 1.

FIG. 3 is a cross-sectional view of adaptor 100. Adaptor 100 includes external threads 102 to mate with internal threads on body 200. Adaptor 100 also includes external threads 104 at a distal end, for mating the adaptor with existing equipment.

Figure 4:
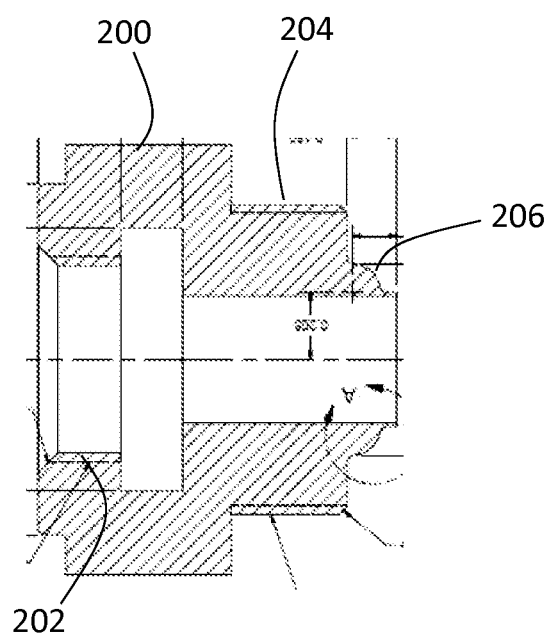
FIG. 4 is a cross-sectional view of a body of FIG. 1.

FIG. 4 is a cross-sectional view of a body 200. The body sealing surface 206 is an annular, radiused surface, e.g., a section of a sphere. When the metal tubing 14 is compressed between the rounded body sealing surface 206 and the conical sealing surface 602 (FIG. 5) of sealing member 600, this forms a line seal in the metal tubing 14.

Figure 5:
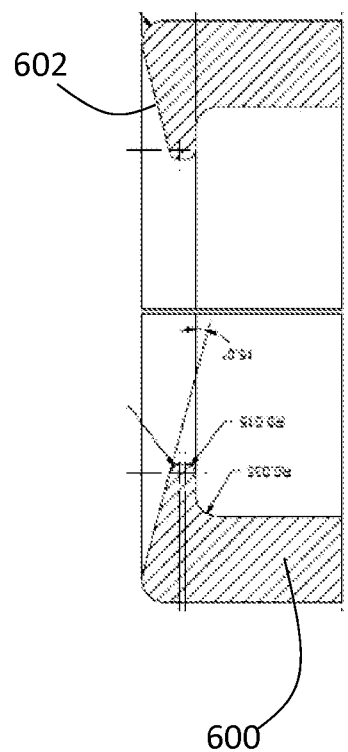
FIG. 5 is a cross-sectional view of a sealing member of FIG. 1.

FIG. 5 is a cross-sectional view of sealing member 600. Shown in FIG. 5 is a planar sealing surface 602, having a frusto-conical cross section. Metal tubing 14 is compressed between sealing surface 602 and body sealing surface 206 to form a fluid-tight, metal-to-metal seal.

Figure 6:
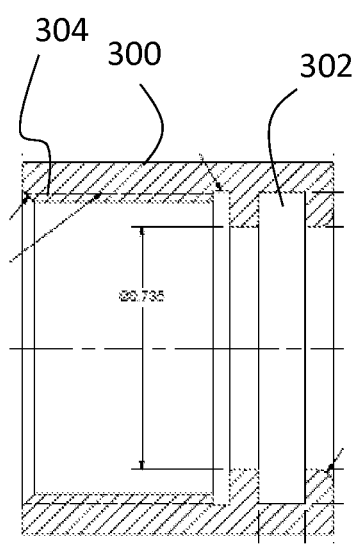
FIG. 6 is a cross-sectional view of a nut of FIG. 1.

FIG. 6 is a cross-sectional view of nut 300. Shown in FIG. 6 is groove 302 for receiving jacket seal 500 and internal threads 304.

A fitting according to embodiments provides multiple seals for the armored cable. The primary seal is a metal-to-metal seal between a conical sealing surface 602 of sealing member 600 and rounded sealing surface 206 of body 200. This seal maintains an interior and exterior seal between the metal tubing and the fitting. The secondary seal is a compression seal utilizing an internal seal 400 (e.g., elastomeric ring) which is compressed between the body 200 and the adaptor 100, and creates a seal between the cable 12 and the fitting 10. The tertiary seal is jacket ring seal 500 (e.g., an elastomeric ring) which seals onto the outer diameter of the jacket 16 on the armor cable.

Embodiments include a fully re-usable fitting for use with corrugated metal armor cabling. The fitting provides exterior and interior sealing mechanisms to isolate the armor protected cable from the end termination. The fitting includes an adaptor, the adaptor on one side contains exterior threads to mount to existing equipment and exterior threads on the other to mate to a body; the body containing an elastomeric seal and internal threads to mate with adaptor on one side and a conical spherical sealing surface with external threads to mate with a nut. The nut on one side contains a sealing member and internal threads which mechanically attach the corrugated armor by compression to the body. The nut, on the other side, contains an elastomeric seal.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fitting for use with a cable contained in a corrugated metal tubing, the fitting comprising:
an adaptor having an internal, longitudinal passage to receive the cable;
a body coupled to the adaptor;
an internal seal positioned between the adaptor and the body, the internal seal to be radially disposed about the cable;
a nut coupled to the body; and
a sealing member positioned between the nut and the body, the sealing member for placement in a valley of the corrugated metal tubing to compress a portion of the corrugated metal tubing between the sealing member and the body.

2. The fitting of claim 1 further comprising:
a jacket seal positioned on an internal surface of the nut, the jacket seal to contact an outer jacket disposed on the corrugated metal tubing.

3. The fitting of claim 1 wherein:
the adaptor is received in a cavity of the body.

4. The fitting of claim 3 wherein:
a first end of the adaptor has external threads to engage internal threads in the cavity of the body.

5. The fitting of claim 1 wherein:
the internal seal is compressed between the adaptor and the body.

6. The fitting of claim 5 wherein:
the internal seal is an elastomeric seal.

7. The fitting of claim 1 wherein:
the nut includes and internal, radial groove;
the fitting comprising a jacket seal positioned in the groove, the jacket seal to contact an outer jacket disposed on the corrugated metal tubing.

8. The fitting of claim 1 wherein:
an end of the body has external threads to engage internal threads in a cavity of the nut.

9. The fitting of claim 1 wherein:
the body includes a body sealing surface and the sealing member includes a sealing surface to compress the portion of the corrugated metal tubing between the body sealing surface and the sealing surface.

10. The fitting of claim 9 wherein:
the body sealing surface is radiused.

11. The fitting of claim 10 wherein:
the body sealing surface includes a section of a sphere.

12. The fitting of claim 9 wherein:
the sealing surface is planar.

13. The fitting of claim 12 wherein:
the sealing surface is frustoconcial.

14. The fitting of claim 1 further comprising:
a jacket seal positioned on an internal surface of the nut, the jacket seal to contact an outer jacket disposed on the corrugated metal tubing;
wherein the adaptor is received in a cavity of the body, a first end of the adaptor has external threads to engage internal threads in the cavity of the body;
wherein the internal seal is an elastomeric seal is compressed between the adaptor and the body;
wherein the nut includes and internal, radial groove and the fitting comprising a jacket seal positioned in the groove, the jacket seal to contact an outer jacket disposed on the corrugated metal tubing.;
wherein an end of the body has external threads to engage internal threads in a cavity of the nut;
wherein the body includes a body sealing surface and the sealing member includes a sealing surface to compress the portion of the corrugated metal tubing between the body sealing surface and the sealing surface, the body sealing surface comprising a section of a sphere and the sealing surface being frustoconcial.

* * * * *